(12) United States Patent
Gallet

(10) Patent No.: US 10,227,881 B2
(45) Date of Patent: Mar. 12, 2019

(54) SELF-CLAMPING FASTENER FOR CMC TURBINE BLADE

(71) Applicant: SNECMA, Paris (FR)

(72) Inventor: Francois Gallet, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 403 days.

(21) Appl. No.: 14/431,294

(22) PCT Filed: Sep. 26, 2013

(86) PCT No.: PCT/FR2013/052278
§ 371 (c)(1),
(2) Date: Mar. 25, 2015

(87) PCT Pub. No.: WO2014/049280
PCT Pub. Date: Apr. 3, 2014

(65) Prior Publication Data
US 2015/0275680 A1 Oct. 1, 2015

(30) Foreign Application Priority Data
Sep. 28, 2012 (FR) ...................................... 12 59175

(51) Int. Cl.
*F01D 5/30* (2006.01)
*F01D 5/26* (2006.01)

(52) U.S. Cl.
CPC ............ *F01D 5/3007* (2013.01); *F01D 5/26* (2013.01); *F01D 5/3084* (2013.01); *Y02T 50/672* (2013.01)

(58) Field of Classification Search
CPC . F01D 5/26; F01D 5/30; F01D 5/3007; F01D 5/3015; F01D 5/3023;
(Continued)

(56) References Cited

U.S. PATENT DOCUMENTS 2,727,716 A 12/1955 Feilden et al.
4,802,824 A * 2/1989 Gastebois ............... F01D 5/282
416/193 A
(Continued)

FOREIGN PATENT DOCUMENTS

DE 818 442 10/1951
FR 2 608 674 6/1988
(Continued)

OTHER PUBLICATIONS

Comments made in response to the International Search Report for PCT/FR2013/052278, 1 page.
(Continued)

*Primary Examiner* — Richard A Edgar
*Assistant Examiner* — Alexander A White
(74) *Attorney, Agent, or Firm* — Womble Bond Dickinson (US) LLP

(57) ABSTRACT

A turbine blade including an airfoil (31) extending above a platform (32) and a root (33) extending below the platform, the root of the blade having the form of a radially extending arm (34), being produced from composite material and including at least one cylindrical face (34). The direction of the generatrices which are oriented in the direction of the platform to allow a clamping piece (5) to slide towards the latter on the cylindrical face under the action of centrifugal force. The arm includes, at its lower end, a protuberance (35) forming a radial bearing point for engagement with an element for retaining the blade on a turbine disc (1). The root (33) is located entirely on the side of the protuberance with respect to the face.

17 Claims, 1 Drawing Sheet

Figure 1:
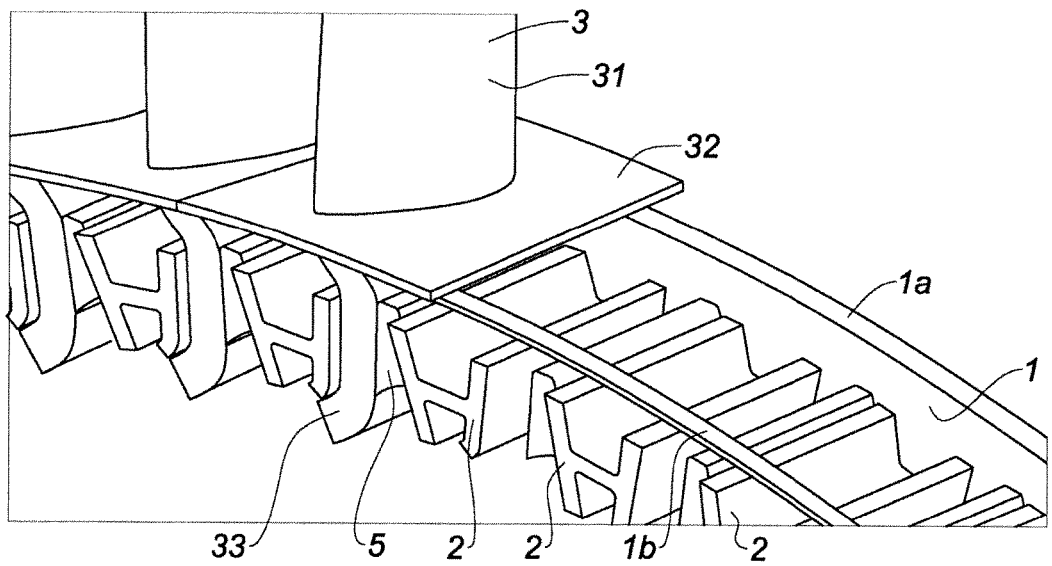

(58) Field of Classification Search
CPC .... F01D 5/3046; F01D 5/3069; F01D 5/3084; F01D 5/32; F01D 5/323; F01D 5/326; F05D 2240/80; F05D 2260/30; F05D 2260/36; F05D 2260/37; F05D 2260/38
See application file for complete search history.

(56) References Cited

U.S. PATENT DOCUMENTS

| | | | |
|---|---|---|---|
| 5,074,754 A | 12/1991 | Violette | |
| 6,135,717 A | 10/2000 | Sokol et al. | |
| 8,251,667 B2 * | 8/2012 | Wilson | F01D 5/3038 |
| | | | 416/215 |
| 2010/0296936 A1 | 11/2010 | Wilson et al. | |

FOREIGN PATENT DOCUMENTS

| | | |
|---|---|---|
| GB | 659592 A | 10/1951 |
| GB | 914548 | 1/1963 |
| JP | S 5573806 | 5/1982 |
| JP | 07-332006 | 12/1995 |
| JP | 2010-270754 A | 12/2010 |

OTHER PUBLICATIONS

Office Action in Japanese Application No. 2015-533672 dated Jul. 18, 2017, with English translation.

* cited by examiner

SELF-CLAMPING FASTENER FOR CMC TURBINE BLADE

The field of the present invention is that of turbine engines and, more particularly, that of turbine blades of these turbine engines.

A turbine engine for an aircraft generally comprises, from upstream to downstream in the direction of flow of the gases, a fan, one or more compressor stages, for example a low-pressure compressor and a high-pressure compressor, a combustion chamber, one or more turbine stages, for example a high-pressure turbine and a low-pressure turbine, and a gas exhaust pipe. A turbine can correspond to each compressor, the two being connected by a shaft, thus forming, for example, a high-pressure (HP) body and a low-pressure (LP) body.

Turbine blades are parts that are subjected to very high temperatures and high levels of mechanical stress due to the centrifugal force that is exerted on them. In particular, the performance of modern engines requires that the temperature to which high-pressure turbine blades are subjected be as high as possible. For this reason, these blades are traditionally made of metal material but it would be attractive to make these blades of composite material and, in particular, of a ceramic matrix composite (CMC) material. The advantage of parts made of CMC is their low density and their excellent temperature resistance. On the other hand, their main defect lies in a lower resistance to stress and in a susceptibility to plastic deformation, which makes it difficult to use them for turbine blades.

Work was initially carried out in order to use this material in the design of LP turbine blades, as for example in the applicant's patent application FR 2943942, because LP turbine blades are subjected to temperatures that are comparatively lower, but it would be attractive to use this technology for HP turbine blades as well.

However, one of the problems encountered in adapting CMC technology to the manufacture of turbine blades lies in the difficulty of designing a device to fasten these blades to the corresponding turbine disc, because the levels of stress in these fasteners are very high, particularly in view of the features of the CMC material.

Studies of fasteners made of CMC that have the conventional shape of a dovetail or of a bulb set into a tooth of the disc have highlighted a number of difficulties that are associated with this configuration. Firstly, as the dimensions, in the case of such a dovetail, are heavily restricted by the space available between the blades, said blades are subject to high levels of deformation stress, which are too high for CMC. In addition, such a device is embodied in shapes that are difficult to produce in CMC because they are complex. It is necessary to produce a bulb, usually by separating these fibres in order to insert a reinforcement there between them. And the flexural stresses are made worse by the stress concentration factors that are due to the complexity of these shapes. Finally, for such a dovetail-shaped device to work, the manufacturing tolerances of these parts would have to be limited, which again is difficult to achieve, at present, for parts made of CMC.

However, various configurations are known for high-pressure blades made of composite material, such as those described in the applicant's patent application FR 2608674, or again in U.S. Pat. No. 2,727,716, JP H07 332006, or GB 914548.

However, these configurations have the disadvantage that they are difficult to fit to the disc because they require multiple operations, with the installation of ancillary parts. In particular, it is not possible to fit them from the external face of the disc, which represents a substantial advantage as regards time for equipping an HP turbine wheel with blades. The object of the present invention is to remedy these disadvantages by proposing a device for fastening the turbine blades that is compatible with the production of a blade in CMC and that is relatively easy and quick to install on the disc.

For this purpose, the subject of the invention is a turbine blade comprising a vane extending above a platform and a root extending below said platform, the root of said blade having the form of a radially extending arm, being produced from composite material and having at least a first plane or cylindrical face, oriented axially, the direction of the generatrices of which is oriented towards said platform, so as to allow a clamping piece to slide on said plane or cylindrical face under the action of the centrifugal force that is exerted on said blade during operation on a turbine engine, characterised in that said arm has at its lower end a protuberance forming a radial bearing point for cooperation with an element for retaining the blade on a turbine disc and in that the root is located entirely on the side of said protuberance relative to said first face.

The shape given to the blade root allows the blade to be fixed to the disc by a clamping piece that wedges it against a cooperating wall, positioned on the disc. Thus, it is possible to give the blade a simple shape while ensuring that it is held on a disc. The simplicity of the shape obtained gives the possibility of producing the blade from a ceramic matrix composite material.

In addition, the presence of a protuberance on its lower portion allows a radial support to be provided which ensures that the blade is retained. Finally, the fact that the blade is located entirely on the same side as this protuberance relative to the face on which the clamping piece slides allows the blade to be fitted from the external face of the disc and thus greatly facilitates the fitting thereof.

Advantageously, said first face is oriented at an angle less than or equal to 30° with the radial direction. This angle gives a good compromise between a high degree of clamping pressure on the root of the blade combined with a low level of radial displacement of the clamping piece.

Preferably, said arm comprises a second plane or cylindrical face, the direction of the generatrices of which is oriented towards said platform, oriented radially, from which said protuberance extends, in a direction opposed to the first face. The root of the blade thus takes an optimal shape as regards the simplicity of its shape, and facilitates the production of the part from composite material.

The invention also relates to a turbine disc for a turbine engine having at its periphery a means for gripping a turbine blade, said gripping means having a first plane or cylindrical face, oriented axially, the direction of the generatrices of which is oriented in a radial plane, forming an angle of less than 45° relative to the radial direction, so as to allow a clamping piece to slide on said first face under the action of the centrifugal force that is exerted on said blade during operation on a turbine engine, characterised in that said gripping means has the form of a spar extending axially between two radial half-discs, said spar extending radially inwards so as to form an element for radially retaining a turbine blade.

Such an angle is considered as sufficiently small enough to allow a clamping piece with an appropriate shape to slide on the inclined cylindrical face of the gripping means, under the action of the centrifugal force that is exerted on said blade during operation on a turbine engine. It should be noted that in order to facilitate this clamping movement, it is possible to introduce rolling elements or deformable strips at the interface between these pieces, in order to eliminate any friction effects.

Advantageously, the gripping means has two plane or cylindrical faces, oriented axially, the directions of the generatrices of which converge on one another towards the inside of the disc at an angle less than or equal to 45°, one forming a support for the sliding of said clamping piece and the other being shaped, at its lower portion, to form an element for radially retaining a blade.

In a preferred embodiment, both faces are plane, the first being oriented radially and the second forming an angle less than or equal to 30° with the radial direction. Preferably, the turbine disc also has a clamping piece having two plane or cylindrical faces, the direction of the generatrices of which is oriented parallel to each of the two cylindrical faces of the gripping means respectively, said piece being positioned so that it bears against one of the plane or cylindrical faces of said gripping means.

Preferably, said clamping piece is a wedge with two plane faces, one forming with the other an angle less than or equal to 30°.

Finally, the invention relates to a turbine engine comprising at least one such turbine disc, fitted with blades such as those described above.

The invention will be better understood, and its other objects, details, features and advantages will become more clearly apparent in the course of the detailed explanatory description that follows of an embodiment of the invention given as a purely illustrative and non-limiting example, with reference to the appended schematic drawings.

Figure 2:
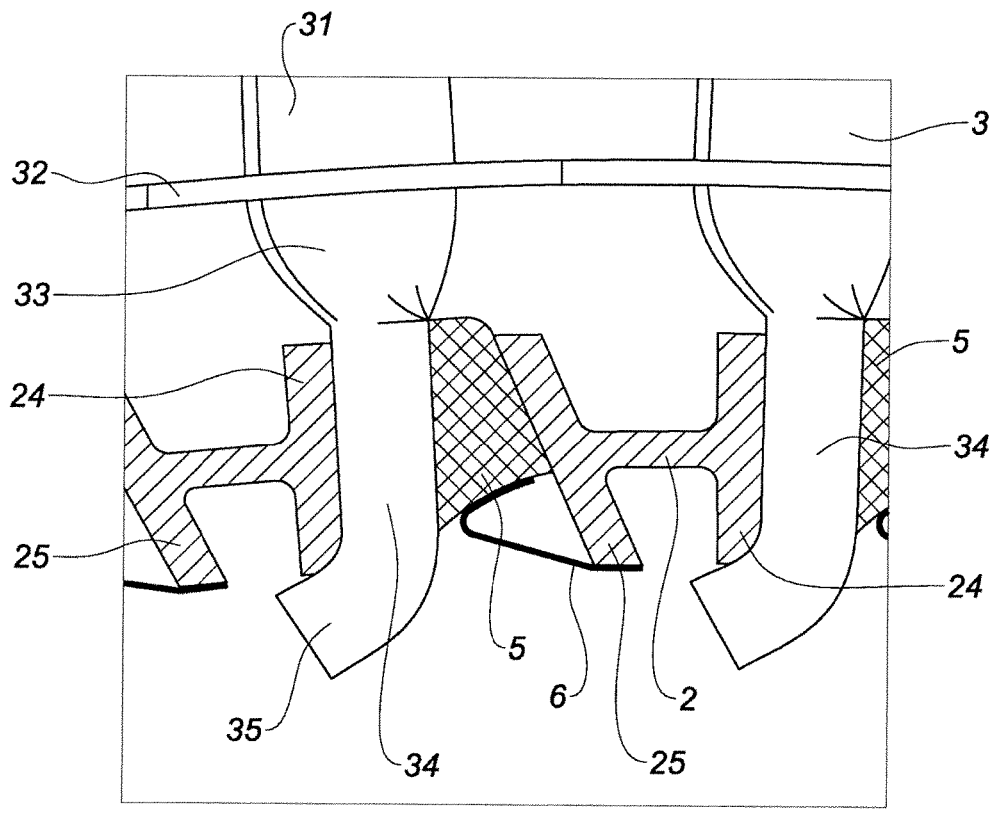

In these drawings:

FIG. 1 is a perspective view of a turbine disc equipped with blades made of CMC and held by a fastener according to an embodiment of the invention, and FIG. 2 is a view of a detail of FIG. 1.

With reference to FIG. 1, there can be seen the upper portion of a turbine disc 1 which is divided into two half-discs, referenced 1a upstream and 1b downstream in terms of the direction of circulation of the gases in the flow path of the turbine engine. For reasons of legibility of the drawing, only the upper outline of the downstream half-disc 1b is shown. Between the upper portions of the two half-discs there extend axially some spars 2, in the form of connectors, which connect the radial faces of the half-discs to one another and which transmit to them the retaining forces of the turbine blades fitted to the disc 1. The number of spars 2 is equal to the number of blades 3 that are fitted to the disc, each of the blades occupying a position between two consecutive spars 2. These spars have an H-shaped radial cross section, although this shape is not essential; the important feature, however, is that its shape has two lateral faces whose specific orientation will be described in more detail, in relation to FIG. 2.

The turbine blades have a vane 31 extending radially above a platform 32 that rests on the outer edge of these half-discs 1a and 1b. Furthermore, it extends below this platform through a root 33 which is made of CMC-type composite material and which takes the form of a wall extending radially, in other words perpendicularly to the platform 32, and which is oriented in an axial plane, in other words along one of the sides of said platform. This wall has a radial cross section shaped like a capital J, the main arm of which extends radially until it extends beyond the radial span of a spar 2; it ends in a protuberance, forming a hook, which is intended to pass below this spar in order to bear thereon and provide a precise positioning of the blade relative to the disc.

FIG. 2 shows, in radial cross section, the arrangement of the different elements that help to hold a blade 3 on a turbine disc 1. The spar 2 comprises circumferentially, on a first side, a substantially radial face 24, against which there bears the radial arm 34 of the root 33 and beneath which the hook 35 forming the end of the root 33 comes into position. On the opposite side, it comprises a face 25 aligned in an axial plane but which is inclined relative to the radial plane at an angle of approximately 30°, so as to form a slope for a clamping piece 5. The clamping piece is shaped as a wedge which is inserted between the radial arm 34 of the blade root and the inclined face 25 of the spar 2 and the point of which is oriented towards the platform 32. It therefore has, on one side, a plane face oriented radially, which cooperates with the plane radial arm 34 of the root of the blade 3 and, on the other side, an inclined face, this face also being at an angle of approximately 30° relative to its radial face in order to be aligned parallel to the inclined face 25 of the spar 2 and to cooperate therewith so as to hold the blade 3 in position on the disc 1.

In rotation, the clamping piece 5 tends, under the effect of the centrifugal field, to slide along the length of the inclined face 25, and thus to exert a pressure against the surface. This pressure will result in an adhesion effect, which will enable the centrifugal forces experienced by the blade to be absorbed.

It should be noted that the movement of the clamping piece 5 relative to the inclined face 25 can potentially be facilitated by putting rollers or a deformable strip in place between these two pieces; this is because this would allow the friction between these two pieces to be reduced.

FIG. 2 also shows, in cross section, an annular part with a V-shaped cross section, forming a spring 6 to hold the clamping piece 5 under pressure against, on one side, the radial arm 34 of the blade root and, on the other side, the inclined face 25 of the spar 2. It extends along the circumference of the disc, a first arm of the V of this spring bearing against the inner base of the spar 2, while the second arm of the V exerts a pressure against the inner face of the clamping piece 5, pushing this piece back outwards when the turbine engine is at a standstill and while no centrifugal force is exerted on it.

A description will now be given of the positioning of a turbine blade made of CMC on a turbine disc and the manner in which it is fixed by virtue of a fastening device according to the invention, and also the principle of clamping the blade onto the disc during operation of the turbine engine.

The disc 1 therefore has a series of spars 2 which are borne by the two half-discs 1a and 1b and which have a free space at their lower part.

The operator first of all installs the spring 6 by making it pass through the existing space between two adjacent spars 2 and by placing the axial end of the innermost arm of the V inside the central hole of the spar 2 which adjoins the blade to be fitted. Likewise, the operator passes the clamping piece 5 into this space and brings it to bear, through its inner face, against the second arm of the V of the spring 6. Then, while pushing the clamping piece 5 downwards, compressing the spring, which moves it away from the preceding spar 2, he introduces the root 33 of the blade to be fitted into the same space, until the hook 35 of the lower portion of the root 33 of the blade has been made to pass below the radial arm 34 of the spar. The blade is then positioned radially by its hook and can no longer escape upwards. Then the operator releases the clamping piece 5 which moves upwards under the effect of the spring 6 and, sliding along the inclined face 25 of the adjacent spar 2, firstly, pushes back the radial face of the blade root and, secondly, presses it against its bearer spar, which puts the blade in place and positions it in a stable manner on the disc 1.

In a version in which no spring is used, the clamping piece is put in place by the centrifugal force that is exerted during rotation of the turbine engine, carrying the part 5 outwards and causing it to slide up the inclined face 25 of the adjacent spar 2. The same result is achieved in use as before, namely that the blade root is clamped by the clamping piece against its bearer spar 2, and that the blade 3 is held in a stable manner on the disc 1 by its hook 35 and the cooperation of said hook with the radial arm 34 of the spar.

It should be noted that this clamping force, which takes the form of an adhesion that prevents the blade from moving under the action of its own centrifugal forces, is proportional to the centrifugal forces of the clamping piece, and that it is therefore proportional to the centrifugal forces of the blade. Thus, whatever the speed of rotation, and in particular in the event of overspeed of the rotor carrying the blade, there is no risk of the blade becoming detached.

The main advantages conferred by the invention can be summarised as follows:

The system automatically makes up for the amounts of play between the blade and the disc. Thus, whatever the thermomechanical expansions of the disc, the clamping will always be the same, because it is determined solely by the speed of rotation of the disc.

As this system adapts by itself to the geometry of the blade, it does not require a precise manufacturing tolerance for the root 33 of the blade or for the clamping piece 5. It is therefore not necessary to grind the face of the composite fastener, which further reduces the manufacturing costs.

The shape of the blade root 33 which is made of composite material is itself very simple, because it is purely rectilinear; it is thus not expensive to manufacture.

The contact surface between the root 33 of the blade 3 and its clamping piece 5 can be increased as much as necessary; it is therefore possible to adjust it in order to limit the plastic deformation stress of the composite, and thus remain within the acceptable level of plastic deformation stress for the material used for the root.

Finally, the weight of the clamping piece is extremely low, typically about 10 grams. It is therefore possible to hollow out the spars and to give them the H shape described above, while retaining the two plane faces intended to come into bearing contact against the radial arm 34 of the blade root and the inclined arm of the clamping piece. This reduction in the weight of the spar 2, combined with the reduction in weight obtained by the choice of CMC material to produce the blade, makes it possible to have a disc that is particularly light and whose dimensions are reduced.

The invention has been described with a plane face for the radial portion of the root on which the clamping piece 5 slides. It is quite clear that the invention can also be made with a non-plane face for the portion of the root in contact with the clamping piece, provided that said clamping piece has a face that can cooperate with it in a sliding movement towards the exterior of the disc. Thus, any cylindrical surface, the direction of the generatrices of which is oriented towards said platform allows the invention to be produced, since it allows a clamping piece with an appropriate shape to be slid, under the action of the centrifugal force that is exerted on said blade in operation on a turbine engine.

The same applies for the inclined face 25 of the spar 2, which can have a cylindrical face, the direction of the generatrices of which is oriented at an angle of less than 45° in relation to the radial direction. Such an angle is considered as still being sufficiently small to allow a clamping piece with an appropriate shape to be slid on said inclined cylindrical face under the action of the centrifugal force that is exerted on said blade in operation on a turbine engine. However, ideally, the angle at the apex of the wedge forming the clamping piece 5 is approximately 30° so that the clamping piece provides a sufficient bearing force, without the movement of the wedge along the faces of the parts that it immobilises being too great.

The invention claimed is:

1. A turbine blade comprising a vane extending above a platform and a root extending below said platform, the root of said turbine blade having the form of a radially extending arm, being produced from composite material, the root having at least a first plane or cylindrical face, oriented axially, wherein a direction of generatrices of said first plane or cylindrical face is oriented towards said platform, so as to allow a clamping piece to slide on said first plane or cylindrical face under an action of a centrifugal force that is exerted on said turbine blade during operation on a turbine engine, wherein said radially extending arm has at a lower end a single protuberance forming an end of the root which extends beyond and below a retaining member retaining the turbine blade on a turbine disc, said protuberance bearing under the retaining member for providing a radial bearing point and a precise positioning, and in that the root is located entirely on a side of said protuberance relative to said first plane or cylindrical face.

2. The turbine blade according to claim 1 wherein the clamping piece has a first plane or cylindrical face which is oriented at an angle less than or equal to 300 with the radial direction.

3. The turbine blade according to claim 2 wherein said radially extending arm comprises a second plane or cylindrical face, oriented axially, wherein a direction of a generatrices of said plane or cylindrical face of said radially extending arm is oriented towards said platform, and oriented radially, from which said protuberance extends, in a direction opposed to the first plane or cylindrical face of the root.

4. A turbine disc for a turbine engine having at a periphery of the turbine disc, a gripping means for gripping said turbine blade according to claim 1, said gripping means having a first plane or cylindrical face, oriented axially, wherein a direction of generatrices of said plane or cylindrical face of said gripping means is oriented in a radial plane, forming an angle of less than 45° relative to the radial direction, to allow a gripping means to slide on said first plane or cylindrical face of the clamping piece under the action of the centrifugal force that is exerted on said turbine blade during operation on a turbine engine, wherein said gripping means has the form of a spar extending axially between two radial half-discs, said spar extending radially inwards so as to form an retaining member radially retaining said turbine blade.

5. The turbine disc according to claim 4 wherein the gripping means has first and second plane or cylindrical faces, oriented axially, a directions of generatrices of said plane or cylindrical face of said radially gripping means converge on one another towards an inside of the turbine disc at an angle less than or equal to 45°, one forming a support for the sliding of said clamping piece and the other being shaped, at its lower portion of the other, to form an retaining member radially retaining a turbine blade.

6. The turbine disc according to claim 5 wherein the first plane or cylindrical face of the gripping means and the second plane or cylindrical face of the gripping means are plane, the first plane face of the gripping means being oriented radially and the second plane face of the gripping means forming an angle less than or equal to 300 with the radial direction.

7. The turbine disc according to claim 5 further comprising a clamping piece having two plane or cylindrical faces, a direction of generatrices of said plane or cylindrical face of said radially clamping piece is oriented parallel to each of the two plane or cylindrical faces of the gripping means respectively, said clamping piece being positioned so that said clamping piece bears against one of the two plane or cylindrical faces of said gripping means.

8. The turbine disc according to claim 7 wherein said clamping piece is a wedge with two plane faces, one forming with the other an angle less than or equal to 30°.

9. The turbine engine comprising at least one turbine disc according to claim 4, fitted with a plurality of said turbine blades.

10. The turbine blade according to claim 1 wherein the clamping piece has a plane face oriented radially and cooperating with the first plane face of the root.

11. The turbine blade according to claim 1 wherein the said first plane or cylindrical face extending in a radial plane.

12. The turbine blade according to claim 1 wherein the radially extending arm of the root has a constant thickness.

13. The turbine blade according to claim 1 wherein the radially extending arm of the root is bent toward one direction.

14. The turbine blade according to claim 1, wherein the retaining member comprises a radially extending arm.

15. The turbine blade according to claim 14, wherein the root has a second face opposite axially to the first face, said second face bearing against a face of the radially extending arm.

16. A Turbine blade comprising a vane extending above a platform and a root extending below said platform, the root of said turbine blade having the form of a radially extending arm, being produced from composite material, the root having at least a first plane or cylindrical face, oriented axially, wherein a direction of generatrices of said first plane or cylindrical face is oriented towards said platform, so as to allow a clamping piece to slide on said first plane or cylindrical face under an action of a centrifugal force that is exerted on said turbine blade during operation on a turbine engine, wherein said radially extending arm has at a lower end a protuberance forming an end of the root, said protuberance extending beyond and below a portion of retaining member retaining the turbine blade on a turbine disc and bearing under said portion for providing a radial bearing point and a precise positioning, and in that the root and said protuberance are located entirely on a side of said first plane or cylindrical face which extends in a radial plane.

17. A Turbine blade comprising a vane extending above a platform and a root extending below said platform, the root of said turbine blade having the form of a radially extending arm, being produced from composite material, the root having at least a first plane or cylindrical face, oriented axially, wherein a direction of generatrices of said first plane or cylindrical face is oriented towards said platform, so as to allow a clamping piece to slide on said first plane or cylindrical face under an action of a centrifugal force that is exerted on said turbine blade during operation on a turbine engine, wherein said radially extending arm has at a lower end a protuberance forming an end of the root, said protuberance extending beyond and below a portion of a retaining member retaining the turbine blade on a turbine disc and bearing under said portion for providing a radial bearing point and a precise positioning, and in that the root is located entirely on a side of said protuberance relative to said first plane or cylindrical face wherein said retaining member retaining the turbine blade extends axially between said root and an adjacent root of another turbine blade.

* * * * *